US009706563B2

(12) United States Patent
Papp et al.

(10) Patent No.: US 9,706,563 B2
(45) Date of Patent: Jul. 11, 2017

(54) SYSTEMS AND METHODS FOR AIR-GROUND MESSAGE PRIORITIZATION

(71) Applicant: Honeywell International Inc., Morristown, NJ (US)

(72) Inventors: Matej Papp, Piestany (SK); Jiri Svoboda, Czech Republic (CZ); Petr Gotthard, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/789,519

(22) Filed: Jul. 1, 2015

(65) Prior Publication Data

US 2017/0006619 A1  Jan. 5, 2017

(51) Int. Cl.
*H04W 72/10* (2009.01)
*H04W 72/04* (2009.01)
(Continued)

(52) U.S. Cl.
CPC ........ *H04W 72/10* (2013.01); *H04B 7/18506* (2013.01); *H04L 47/6215* (2013.01);
(Continued)

(58) Field of Classification Search
CPC ............... H04W 72/10; H04W 72/042; H04W 72/0413; H04B 7/18506
See application file for complete search history.

(56) References Cited

U.S. PATENT DOCUMENTS 7,512,714 B2   3/2009 Eckert
8,850,552 B2   9/2014 Kauffman et al.
(Continued)

FOREIGN PATENT DOCUMENTS

EP    2261811    12/2010

OTHER PUBLICATIONS

Burgemeister, "Aeronautical Communications Panel Working Group N—Networking Scenario Comparison, Air/Ground Data Communication", Oct. 11-19, 2004, pp. 1-9, Published in: New Orleans, LA.
(Continued)

*Primary Examiner* — Mohammad Anwar
(74) *Attorney, Agent, or Firm* — Fogg & Powers LLC

(57) ABSTRACT

Systems and methods for air-ground message prioritization are provided. In one embodiment, an message communication system comprises: a first Class-of-Service and Priority Tagging Module configured to tag messages with a message tag, the message tag comprising a Class-of-Service tag and a Priority tag; a queue broker that includes a plurality of message queues, wherein each message queues is associated with a Class-of-Service defined by at least one datalink technology, wherein the queue broker assigns each of the messages to one of the plurality of message queues based on a Class-of-Service indicated by the Class-of-Service tag; and an on-board message broker that monitors datalink availability and current state indicators, wherein the on-board message broker communicates to the queue broker when to transition one or more of the message queues between a Prioritize-and-Store operating state and a Prioritize-and-Forward operating state based on the datalink availability and the current state indicators.

20 Claims, 8 Drawing Sheets

(51) Int. Cl.
| | | |
|---|---|---|
| *H04B 7/185* | (2006.01) | |
| *H04L 29/08* | (2006.01) | |
| *H04L 12/863* | (2013.01) | |
| *H04L 12/861* | (2013.01) | |

(52) U.S. Cl.
CPC ............ *H04L 49/90* (2013.01); *H04L 67/322* (2013.01); *H04W 72/042* (2013.01); *H04W 72/0413* (2013.01)

(56) References Cited

U.S. PATENT DOCUMENTS

| | | | | |
|---|---|---|---|---|
| 2004/0085964 A1* | 5/2004 | Vaananen | ........... | H04L 12/5693 370/395.4 |
| 2007/0255850 A1* | 11/2007 | Gould | ................. | G08G 5/0026 709/240 |
| 2008/0086554 A1 | 4/2008 | Royalty | | |
| 2008/0144617 A1 | 6/2008 | Molsberry et al. | | |
| 2011/0255506 A1 | 10/2011 | Toth et al. | | |

OTHER PUBLICATIONS

, "SITA Positioning Paper: Aircom New Generation Services from ACARS to ICAO and IP Services", 2010, pp. 1-28, Publisher: SITA.

European Patent Office, "Extended European Search Report from EP Application No. 16174878.5", "from Foreign Counterpart of U.S. Appl. No. 14/789,519", Aug. 26, 2016, pp. 1-11, Published in: EP.

Xu, Kai et al, "Interoperability Among Heterogeneous Networks for Future Aeronautical Communications", "Future Aeronautical Communications", Sep. 26, 2011, pp. 147-171, Publisher: InTech.

European Patent Office, "Communication under Rule 71(3) EPC from EP Application No. 16174878.5, mailed Apr. 13, 2017", "from Foreign Counterpart of U.S. Appl. No. 14/789,519", Apr. 13, 2017, p. 170, Published in: EP.

* cited by examiner

| Message Group Category | Example Messages |
|---|---|
| 1) System messages | datalink logon, link test |
| 2) Free text | FOC operations related free text messages |
| 3) Text weather | METAR, TAF, SIGMET, D-ATIS, FMS weather, de-icing request, etc. |
| 4) AIS | NOTAM, company NOTAM, airport delay |
| 5) Flight plan | Flight folder, briefing package, OFP, flight plan recalculation, take-off/landing performance |
| 6) Mass and balance | loadsheet, airwaybill, NOTOC, PAX manifest |
| 7) Position reports | flight status, position, diversion, ETA |
| 8) Aircraft related | fuel, engine status, maintenance problem, telemetry, etc. |
| 9) Crew related | crew list, rotation |
| 10) Log | techlog, crew log, cabin log, reports |

| Technology | Information domains | Coverage | Irreq. | BW | Cost |
|---|---|---|---|---|---|
| VDL Mode 2 (ACARS) | Air Traffic | Continental worldwide | VHF | Low | High |
| L-DACS | Air Traffic | Continental EU only | VHF | Intermed. | High |
| AeroMACS (802.16) | Air Traffic, Airline Operational | Some Airports | VHF | High | Intermed. |
| Cellular GPRS | Airline Operational, (Entertainment) | Some Airports | VHF | Low | Low |
| Cellular UMTS, LTE | Airline Operational, Entertainment, Passenger Internet | Some Airports | VHF | High | Low |
| WiFi (802.11) | Airline Operational, Entertainment, Passenger Internet | Some Airports | VHF | High | Low |
| Terrestial AG (GoGo, AT&T) | Airline Operational, Entertainment, Passenger Internet | Oceanic, Continental worldwide | VHF | Intermed. | Low |
| HFDL (ACARS) | Air Traffic | Oceanic, Continental worldwide | HF | Low | High |
| Classic SATCOM (Aero H, H+, I) | Air Traffic | Oceanic, Continental worldwide | SAT COM | Low | High |
| Iridium | Airline Operational | Oceanic, Polar, Continental worldwide | SAT COM | Low | Intermed. |
| Inmarsat Swift64 | Airline Operational | Oceanic, Continental worldwide | SAT COM | Low | Intermed. |
| Inmarsat Swift Broadband (SBB) | (Air Traffic), Airline Operational | Oceanic, Continental worldwide | SAT COM | Intermed. | Intermed. |
| Ka band | Airline Operational | Oceanic, Continental worldwide | SAT COM | Intermed. | Intermed. |
| Ku band | Entertainment, Passenger Internet | Oceanic, Continental worldwide | SAT COM | Intermediate | Intermediate |

| Types of messages | Pre-flight | Taxi | Climb | Phases of flight Cruise | Descent | Approach | Taxi | Post-flight |
|---|---|---|---|---|---|---|---|---|
| System messages (datalink logon, link test) | x | x | x | x | x | x | x | x |
| Free text (FOC operations related free text messages) | x | x | x | x | x | x | x | x |
| Text weather (METAR, TAF, SIGMET, D-ATIS, FMS weather, de-icing request, etc.) | x | x | | x | x | | | x |
| AIS (NOTAM, company NOTAM, airport delay) | x | x | | x | x | x | | x |
| Flight plan (Flight folder, briefing package, OFP, flight plan recalculation, take-off/landing performance) | x | x | | x | x | | | x |
| Mass and balance (loadsheet, airwaybill, NOTOC, PAX manifest) | x | | | x | | | | x |
| Position reports (flight status, position, diversion, ETA) | | x | x | x | x | x | x | |
| Aircraft related (fuel, engine status, maintenance problem, telemetry, etc.) | x | x | x | x | x | x | x | x |
| Crew related (crew list, rotation) | x | | | x | | | | x |
| Log (techlog, crew log, cabin log, reports) | x | | | x | | | | x |
| Graphical weather (SAT images, radar, etc.) | x | | | x | x | | | x |
| Databases (software, electronic library, navigation database, charts) | x | | | x | | | | x |

Fig. 6

System messages (Bandwidth / Cost)

| | Pre-flight | Taxi | Climb | Cruise |
|---|---|---|---|---|
| Low/Low | 1 | 1 | | |
| Low/Intermediate | 2 | 2 | | |
| Low/High | 3 | 3 | | |
| Intermediate/Low | 4 | 4 | 1 | 1 |
| Intermediate/Intermediate | 5 | 5 | 2 | 2 |
| Intermediate/High | 6 | 6 | 3 | 3 |
| High/Low | 7 | 7 | 4 | 4 |
| High/Intermediate | 8 | 8 | | 5 |
| High/High | 9 | 9 | | |

Free text (Bandwidth / Cost)

| | Pre-flight | Taxi | Climb | Cruise |
|---|---|---|---|---|
| Low/Low | 1 | 10 | | |
| Low/Intermediate | 2 | 11 | | |
| Low/High | 3 | 12 | | |
| Intermediate/Low | 4 | 13 | 5 | 6 |
| Intermediate/Intermediate | 5 | 14 | 6 | 7 |
| Intermediate/High | 6 | 15 | 7 | 8 |
| High/Low | 7 | 16 | 8 | 9 |
| High/Intermediate | 8 | 17 | | 10 |
| High/High | 9 | 18 | | |

Text weather (Bandwidth / Cost)

| | Pre-flight | Taxi | Climb | Cruise |
|---|---|---|---|---|
| Low/Low | 1 | 19 | | |
| Low/Intermediate | 2 | 20 | | |
| Low/High | 3 | 21 | | |
| Intermediate/Low | 4 | 22 | | 11 |
| Intermediate/Intermediate | 5 | 23 | | 12 |
| Intermediate/High | 6 | 24 | | 13 |
| High/Low | 7 | 25 | | 14 |
| High/Intermediate | 8 | 26 | | 15 |
| High/High | 9 | 27 | | |

Fig. 7

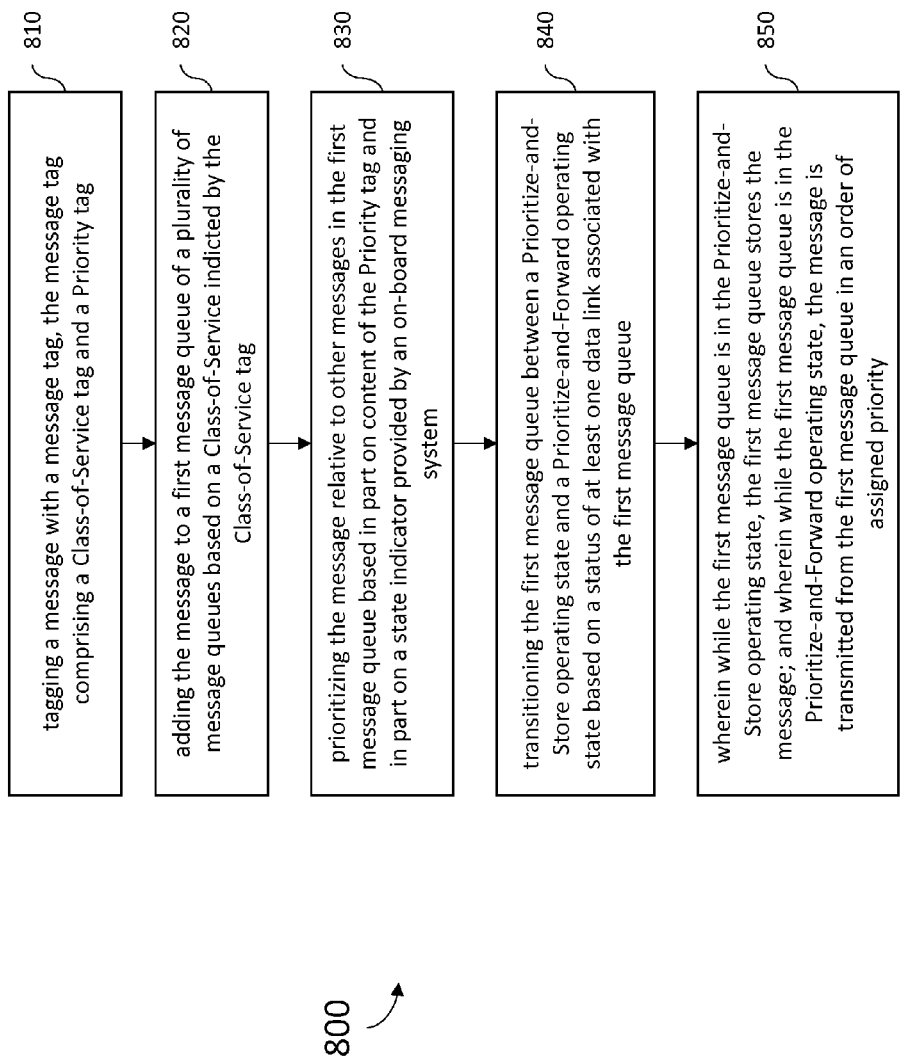

SYSTEMS AND METHODS FOR AIR-GROUND MESSAGE PRIORITIZATION

BACKGROUND

Data transmissions between aircraft and ground stations are becoming increasingly frequent and increasingly large raising potential issues with respect to the cost of transmitting data and the amount of data than needs to be transmitted at a particular moment of time. In some circumstances, the cost of completing a transmission may be higher than acceptable to an air-service user. The operational benefits provided by new types of data services might not balance the communication costs needed to provide the services, which will be a factor in determining whether a particular service remains economically feasible.

For the reasons stated above and for other reasons stated below which will become apparent to those skilled in the art upon reading and understanding the specification, there is a need in the art for alternate systems and methods for providing air-ground message prioritization.

SUMMARY

The Embodiments of the present invention provide methods and systems for providing air-ground message prioritization and will be understood by reading and studying the following specification.

Systems and methods for air-ground message prioritization are provided. In one embodiment, a message communication system comprises: a first Class-of-Service and Priority Tagging Module configured to tag messages with a message tag, the message tag comprising a Class-of-Service tag and a Priority tag; a first queue broker that includes a plurality of message queues, wherein each plurality of message queues is associated with a Class-of-Service defined by at least one datalink technology, wherein the first queue broker assigns each of the messages to one of the plurality of message queues based on a Class-of-Service indicated by the Class-of-Service tag; and an on-board message broker that monitors datalink availability and current state indicators wherein the on-board message broker communicates to the first queue broker when to transition one or more of the plurality of message queues between a Prioritize-and-Store operating state and a Prioritize-and-Forward operating state based on the datalink availability and the current state indicators.

DRAWINGS

Embodiments of the present invention can be more easily understood and further advantages and uses thereof more readily apparent, when considered in view of the description of the preferred embodiments and the following figures in which:

FIG. 3 is a table illustrating message group categories defined for an air-space user policy of one embodiment of the present disclosure;

FIG. 4 is a table illustrating datalink technology characteristics as defined for an air-space user policy of one embodiment of the present disclosure;

FIG. 6 is a table defining when message group categories define in the table of FIG. 3 may be transmitted during different aircraft flight phases for an air-space user policy of one embodiment of the present disclosure;

FIG. 7 is a table illustrating application of prioritization rules for transmitting messages as defined by an air-space user policy of one embodiment of the present disclosure; and FIG. 8 is a flow chart illustrating a method of one embodiment of the present disclosure.

In accordance with common practice, the various described features are not drawn to scale but are drawn to emphasize features relevant to the present invention. Reference characters denote like elements throughout figures and text.

DETAILED DESCRIPTION

Figure 1:
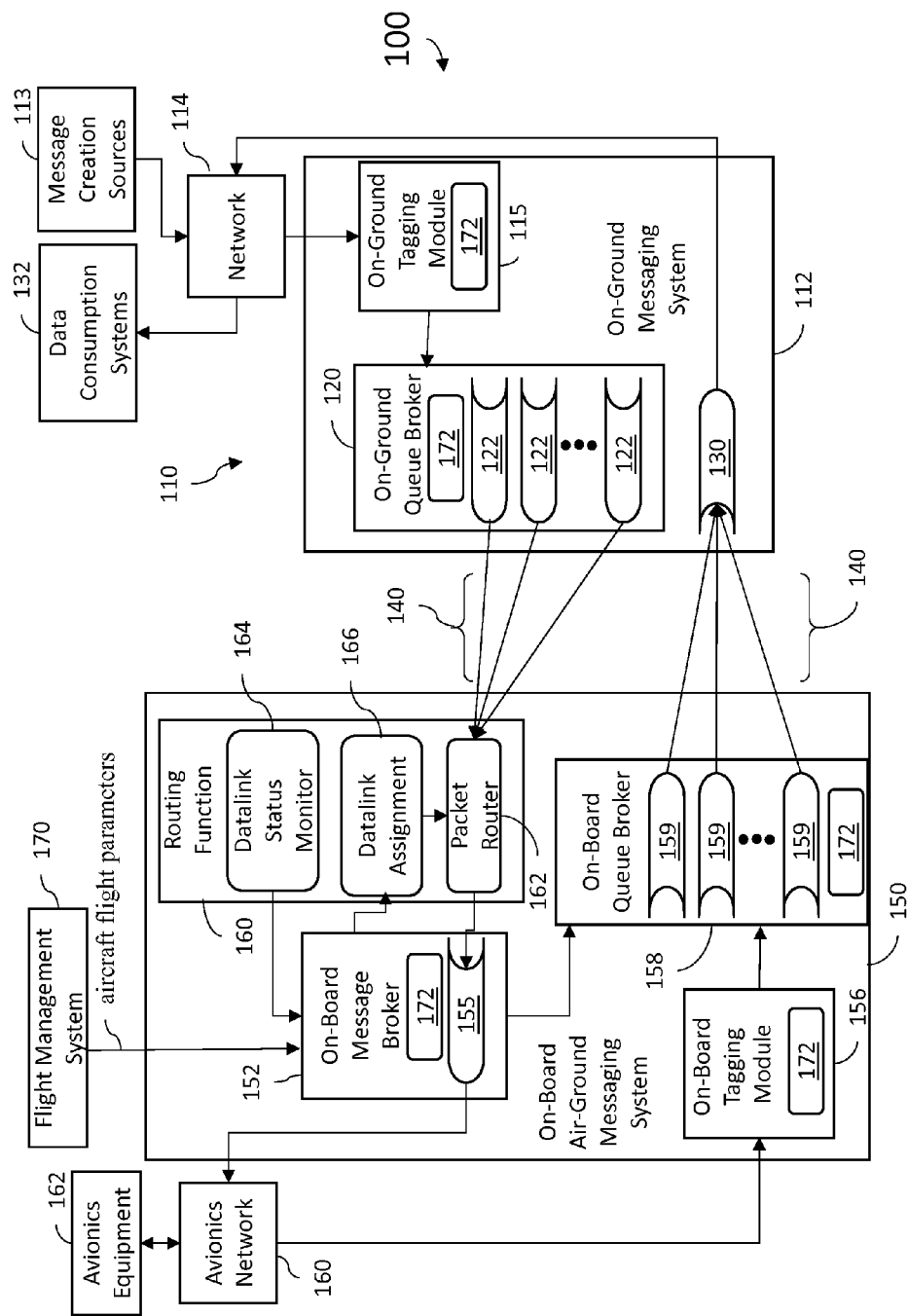
FIG. 1 is a diagram of an air-ground message communication system of one embodiment of the present disclosure.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods to evaluate the types of communication channels and the types of messages needed to implement emerging operational services and provide an air-space user with a means to influence rules dictating how and when messages are communicated over air-to-grown datalinks and a means to tune those rules. For example, in certain stages of a flight in may not be necessary to transmit certain types of information generated on-board an aircraft to a ground station. The decision not to transmit such data can be based on a determination that this type of data only needs to be transmitted at a certain frequency, that transmission of the data is not of sufficient importance at a particular moment where only very expensive communication channels are available (and can therefore wait until a less expensive channel is available).

Embodiments of the present disclosure provide an airspace user with the ability to configure rules that an on-board avionics air-ground messaging system applies to regulate the communication of messages between an aircraft and a ground station so that data that is important or relevant at a given moment is prioritized accordingly and transmitted over a communications channel offering the best datalink from a cost and performance perspective. As the term is used herein, the "air-space user" refers to the business operator of particular aircraft (such as an aircraft owner, an airlines, a charter Company, or other managing entity, for example). The rules may be generically applied across a fleet of aircraft, or customized per aircraft and per flight, to meet business needs or expectations.

As the term is used herein, an on-board air-ground messaging system refers to on-board avionics equipment that carries out the function of transmitting and receiving uplink messages between the aircraft and a ground stations, and corresponding ground-based electronic components that are involved in carrying out this function. Aircraft Communications Addressing and Reporting System (ACARS) and System Wide Information Management (SWIM) system are two examples of such air-ground messaging systems. The on-board air-ground messaging system will communicate with at least one ground based communication station that includes on-ground messaging equipment such as in an air-space user's Flight Operations Center (FOC). It should be noted that the term "on-board" as used herein when referring to an "on-board" system element refers to a system element that is incorporated into or otherwise on-board an aircraft, regardless of whether that aircraft itself is airborne or on the ground.

With embodiments of the present disclosure, for uplink messages, a data message is originated by on-ground messaging equipment which will categorize, prioritize, and tag each message it prepares for transmission to an aircraft, and place each message into an on-ground uplink message queue associated with a message's tag. The on-board air-ground messaging system, by applying rules that weigh current flight conditions and other considerations, makes the determination as to which on-ground message queue may connect to an air-ground data link (and which air-ground data link it may connect to) to transmit messages to the aircraft. The on-ground messaging equipment will then transmit the contents of that message queue to the aircraft in the order of priority indicated by each message's tag. The on-ground messaging equipment may continue to transmit messages from that active queue for as long at the on-board air-ground messaging system permits. As such, in some circumstances, a newly generated uplink message may be transmitted with little or no delay, for example, if it is categorized into a currently active queue and it has a priority higher than other messages already in that queue. If one or more other messages in that queue do have a higher priority, it will be transmitted as soon at the higher priority message have been sent (assuming that the queue remains active). Such an active queue is referred to herein as a "Prioritize-and-Forward" queue because the queue first determines the relative priority of a new message (based on its message tag), and then forwards the message to the aircraft in the order of its assigned priority.

In contrast, an inactive ground message queue is referred to as a "Prioritize-and-Store" queue, because it is not connected to an active data link from which it can transmit its stored messages. When a message, based on the message's tag, is categorized to go into a currently inactive queue, the message is prioritized relative to the other messages presently in the queue and stored there. At some future point in time, when the rules applied by the on-board air-ground messaging system permit that queue to connect to an air-ground data link and become active, the Prioritize-and-Store will transition to a Prioritize-and-Forward queue and begin to transmit its contents as described above. Similarly, when a Prioritize-and-Forward queue is disconnected from a data link by the on-board air-ground messaging system, it transitions into a Prioritize-and-Store queue.

Any one aircraft may be configured to subscribe to a set comprising one or more of the on-ground message queues available via any given ground station. In one embodiment, the on-ground messaging equipment may send information to be distributed to multiple aircraft to a specific queue (based on the message's tag as described above) and the on-ground message queue will replicate the message so that separate instances of that message are stored in the queue for each aircraft subscribed to this queue. Once an aircraft is connected over a suitable link, its on-board air-ground messaging system retrieves messages for its consumption from the ground-based queue and distributes the data internally to its airborne systems. As such, at any one moment in time, an on-ground message queue may be in a "Prioritize-and-Forward" operational state with respect to a first aircraft, while also in a "Prioritize-and-Store" operational state with respect to a second aircraft.

With embodiments of the present disclosure, processing of downlink messages is similar to uplink messages except that all categorizing, prioritizing, tagging, queuing and rule processing takes place within the on-board air-ground messaging system, leaving just messaging consumption functions with the on-ground messaging system. That is, for downlink messages, a data message is originated by on-board avionics and send to the on-board air-ground messaging system, which will categorize, prioritize, and tag each downlink message it prepares for transmission to the ground station. Each downlink message is placed into an onboard message queue associated with a message's tag. The on-board air-ground messaging system, by applying rules that weigh current flight conditions and other considerations, makes the determination as to which airborne message queue may connect to an air-ground data link (and which air-ground data link it may connect to) to transmit messages to the ground. Those onboard message queues actively assigned and connected to a datalink by the on-board air-ground messaging system function as a "Prioritize-and-Forward" queue in the same manner as described above. Those onboard message queues not actively assigned and connected to a datalink by the on-board air-ground messaging system function as a "Prioritize-and-Store" queue in the same manner as described above.

FIG. 1 is a diagram illustrating an air-ground message communication system 100 of one embodiment of the present disclosure. System 100 comprises components for processing both uplink messages and downlink messages according to the embodiments of the present disclosure. System 100 comprises a ground station 110 (which may comprise a Flight Operations Center) which includes an on-ground messaging system 112. On-ground messaging system 112 may receive incoming messages intended for transmission to one or more aircraft from a multitude of message creation sources 113. As shown in FIG. 1, the on-ground messaging system 112 includes an on-ground Class-of-Service (CoS) and Priority Tagging Module 115 (also referred to herein as the on-ground tagging module 115). On-ground tagging module 115 may be coupled to a network 114 from which the air-ground messaging system 100 receives messages generated by the message creation sources 113. For each message received via network 114 that is intended for uplink transmission to an aircraft, on-ground tagging module 115 assigns two messages tags. The first message tag is a Class of Service (CoS) tag that determines the types of data links (e.g., cellular, Wi-Fi (IEEE 802.11), satellite, etc.) that may be used to transmit that particular message. Each CoS may be associated with a particular on-ground message queue. The second message tag is a priority tag that determines the order in which messages in a message queue will be transmitted once the message queue becomes an active Prioritize-and-Forward queue.

The on-ground messaging system 112 further comprises an on-ground queue broker 120 which manages a plurality of on-ground message queues 122 utilized for processing uplink messages and transmitting those messages via datalinks 140. Based on the message tags applied to a message by the on-ground tagging module 115, on-ground queue broker 120 places the message into the one of the on-ground message queues 122 associated with the CoS indicated by the messages CoS tag. Within that queue 122, the on-ground queue broker 120 prioritizes the newly received message for transmission relative to the priorities of messages previously entered into that message queue 122. If that particular queue 122 is active, it will operate as a Prioritize-and-Forward queue as described above and on-ground queue broker 120 will transmit each message in queue 122 to the aircraft via its authorized data link in order of its relative priority. If two messages within queue 122 have been assigned the same priority level (that is, based on their priority tags), on-ground queue broker 120 may transmit those messages in the order they were received, or if bandwidth permits, transmit them simultaneously. In contrast, if that particular queue 122 is inactive, it will operate as a Prioritize-and-Store queue as described above until such time as it transitions to a Prioritized and Forward queue. With respect to receiving downlink messages, on-ground messaging system 112 also comprises a downlink message consumption queue 130. Transmission of downlink messages are managed by an aircraft's on-board air-ground messaging system as described in more detail below. When on-ground messaging system 112 receives downlink messages, downlink message consumption queue 130 distributes those messages to their intended recipient. For example, in some embodiments, downlink message consumption queue 130 is coupled to network 114 and forwards downlink messages to one or more data consumption components 132 (which may or may not comprise the same physical ground systems as creation sources 113).

The on-aircraft component of air-ground message communication system 100 comprises the on-board air-ground messaging system 150. On-board air-ground messaging system 150 includes an on-board message broker 152, an on-board uplink message consumption queue 155, (to distribute received uplink messages), an on-board Class-of-Service (CoS) and Priority Tagging Module 156 (also referred to herein as the on-board tagging module 156) and an on-board queue broker 158 (to process downlink messages). The on-board air-ground messaging system 150 also comprises a routing function 160. On-board air-ground messaging system 150 manages the transmission of uplink and downlink messages depending on factors such a data link availability, the current actual flight phase of the aircraft, and the message tags assigned to messages.

With respect to downlink messages, on-board message broker 152 processes the downlink messages in a very similar manner to how on-ground messaging system 112 processes uplink messages.

On-board air-ground messaging system 150 is coupled by avionics network 160 to a plurality of different avionics equipment 162 from which it may receive incoming messages intended for transmission to ground station 110. The on-board Class-of-Service (CoS) and Priority Tagging Module 156 (also referred to herein as the on-board tagging module 156) may be coupled by avionics network 160 from which it receives messages generated by the avionics equipment 162. For each message received via network 160 that is intended for downlink transmission, on-board tagging module 156 assigns two messages tags. The first message tag is a Class of Service (CoS) tag that determines the types of data links (e.g., cellular, Wi-Fi, satellite, etc.) that may be used to transmit that particular message. Each CoS may be associated with a particular on-board message queue managed by the on-board queue broker 158. The second message tag is a priority tag that determines the order in which messages in a message queue will be transmitted once the on-board message queue becomes an active Prioritize-and-Forward queue.

On-board queue broker 158 which manages a plurality of on-board message queues 159 utilized for processing downlink messages. Based on the message tags applied to a message by the on-board tagging module 156, on-ground queue broker 158 places the message into the one of the on-board message queues 159 associated with the CoS indicated by the message's CoS tag. Within that queue 159, the on-board queue broker 158 prioritizes the newly received message for transmission relative to the priorities of messages previously entered into that message queue 159. If that particular queue 159 is active, it will operate as a Prioritize-and-Forward queue as described above and on-board queue broker 158 will transmit each message in queue 159 to the ground station 110 via its authorized data link in order of its relative priority. If two messages within a single queue 159 have been assigned the same priority level (that is, based on their priority tags), on-board queue broker 158 may transmit those messages in the order they were received, or if bandwidth permits, transmit them simultaneously. In contrast, if that particular queue 159 is inactive, it will operate as a Prioritize-and-Store queue as described above until such time as it transitions to a Prioritized and Forward queue. With respect to receiving uplink messages, when on-board air-ground messaging system 150 receives the uplink messages, they are routed by a packet router 162 of routing function 160 to the on-board uplink message consumption queue 155 which distributes those messages to their intended recipient. For example, in some embodiments, uplink message consumption queue 155 is coupled to network 160 and forwards downlink messages to one or more of the avionics systems 162.

The process of determining when a Prioritize-and-Store queue (whether an on-ground message queue 122 or an on-board message queue 159) is determined by on-board message broker 152 in conjunction with data link information from a datalink status monitor 164 within routing function 160 and an aircraft flight parameter (such as the aircraft current phase of flight, or aircraft position) the aircraft's flight management system 170.

As discussed above, tagged messages, whether uplink or downlink, are sent to the corresponding queue broker (i.e., on-ground broker 120 for uplink messaged or on-board broker 158 for downlink messages) where, based on the CoS and Priority tagging, the broker determines which message queue the message is to be placed. Depending on operating state of the message queue to which the message is assigned, the message may be delivered immediately, delivered after a short delay while other higher-priority messages in that message queue are delivered, or stored until a datalink associated with the message queue is activated.

The circumstances under which a Prioritize-and-Store queue is transitioned into a Prioritize-and-Forward queue, and vise verse, is based on the categorization of available data link types and the categorization of messages types with respect to flight phases, as determined by the air-space user. These determinations are stored in policies 172 that are implemented by the on-board and on-ground brokers (120, 152, 158) and tagging modules (115, 156).

Figure 2:
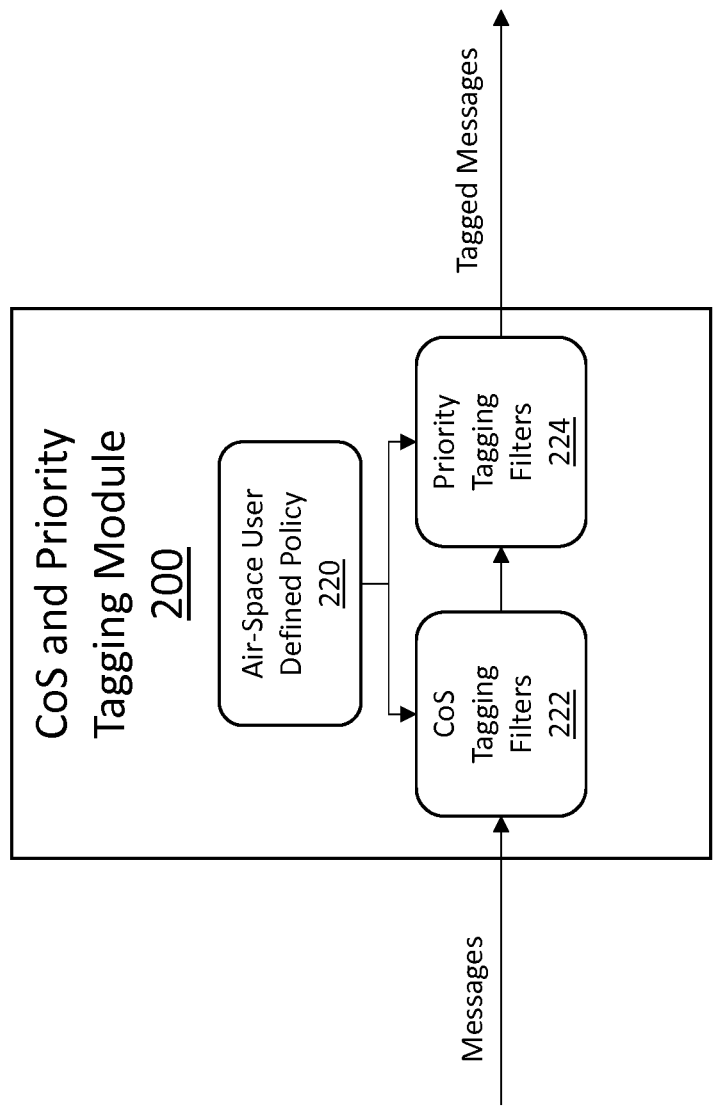
FIG. 2 is a diagram of a Class-of-Service (CoS) and Priority Tagging Module of one embodiment of the present disclosure.

FIG. 2 is a block diagram illustrating a Class-of-Service (CoS) and Priority Tagging Module 200, which may be used to implement either an on-ground tagging module for tagging uplink messages (such as tagging module 115) or an on-board tagging module for tagging downlink messages (such as tagging module 156). With embodiments of the present disclosure, the type of messages communicated between an aircraft and a ground station may fall into one of several categories. Tagging Module 200 includes one or more CoS Tagging Filters 222 and one or more Priority Tagging Filters 224 which respectively apply the Cos and Priority Tags onto incoming messages based on an Air-Space User Defined Policy 220. The output of tagging module 200 are tagged messages each comprising a message tag that includes the Cos and Priority Tags. In one embodiment, when tagging module 200 receives an incoming message, it categorizes the message, based on the air-space user generated policy 220, into one of a plurality of message groups pre-defined by the air-space user in policy 220. Table 300 in FIG. 3 provides example message group categories which may be defined by the air-space user for one implementation of the present disclosure, such as use with system 100. For example, a message related to a flight status would be categorized into the "Position Reports" message group category, while a message related to the aircraft's engine status or fuel status would be categorized into the "Aircraft Related" message group category. For each different message types, the Priority Tagging Filters 224 would assign an incoming message to one of the message group categories as dictated by the air-space user defined policy, which forms the basis of the priority tag.

The air-space user may also categorize the various potential types of data links 140 which may potentially be used for air-ground communications into several groups and shown in Table 400 in FIG. 4. Table 400 illustrates characteristics of the various data link technologies that are theoretically available to an air-space user to establish the uplink and downlink datalink 140 which are used to transmit messages. Depending on each data link technologies' availability coverage, bandwidth, and costs, the air-space user may categorize each of the data link technologies identified in Table 400 to into several Classes of Service CoS as illustrated in Table 500 shown in FIG. 5. The Classes of Service are a defined as a two-dimensional categorization matrix with Cost (low, intermediate or high) being one dimension and Bandwidth (low, intermediate or high) being the second dimension. CoS Tagging Filters 222 assigns to each message the CoS tag identifying one of these two-dimensional categorizations based on the air-space user defined policy 220. This categorization determines which message queue a message will be place in and also established the data link technologies which, per policy 220, may be used to communicate that message. The air-space user may subjectively determine the cut-off criteria associated with each dimension for placing a particular technology into a particular Class of Service. In this way, messages are identified and consequently put into the message group categories by tagging module 200 to ensure their prioritization for proper tagging.

Once the various data links and their associated CoS are defined, the air-space user may 1) define which data links the company is willing to use for each flight phase, and 2) for each message group category shown in Table 300, assign a priority within the context of each CoS. Additionally, the prioritization associate with a particular message group category may change for each phase of flight. For example, as illustrated in table 600 in FIG. 6, different message group categories may be either allowed entirely prohibited in different flight stages. For example, in table 600 an "x" indicates where transmitting a message belonging to that message group category is permitted during a particular flight phase. For example, in this example implementation illustrated by table 600, system messages and free text messages are permitted during all phases of flight. In contrast, Mass and Balance messages, Crew Related messages, Database messages and Log messages are only permitted in Pre-Flight, Cruise and Post-Flight phases, but prohibited in Taxi, Climb, Descent and Approach phases.

Even when a particular message group category is authorized during a given phase of flight, the priority associated with a particular message may be different depending on the phase of flight, as illustrated by Table 700 in FIG. 7. Table 700 illustrates an example setup for the first three types of messages group categories (System messages 710, Free text messages 720 and Text weather 730) which are define in table 300, for the first four flight phases (pre-flight, taxi, climb, cruise) defined in table 600. It should be appreciated that these categorizations are provided for illustrative purposes only and that actual implementations should include specifications for each of the defined possible message group categories and for each of the defined possible stages of flight. Table 700, for each message group category, provides the relative priority assigned to a messages based on the current phase of flight, and based on which Class-of-Service it was assigned. The prioritization indicated in table 700 are applied by the on-board message broker 152 using rules defined by the air-space user in policy 172.

As shown in Table 700, during the pre-flight phase, system messages 710, free text messages 720 and text weather messages 730, for any given Class-of-Service, have the same priority, but Class-of-Service categories associated with lower cost datalinks will have higher priority as compared to those that are more expensive. For example, assuming that an aircraft is on the ground at an airport where datalink status monitor 164 determines that a Wi-Fi datalink is available. The air-space user policy 172 on Class-of-Service categorizations, shown in Table 5, identifies Wi-Fi as a datalink having a high bandwidth/low cost Class-of-Service (identified in the table at 745 for each of the message class categories 710, 720 and 730). At this time, if a message queue associated with the high bandwidth/low cost Class-of-Service includes a system message, a free text message and a text weather message, the queue broker will prioritize each of these messages with the same priority level 7. Further, transmission of each of these message types are permitted during this phase of flight as indicated by table 600. As such, on-board message broker 152 will notify the data link assignment function 166 to activate the Wi-Fi datalink associated with the high bandwidth/low cost Class-of-Service message queue, transitioning that queue from the Prioritize-and-Store operating state to the Prioritize-and-Forward operating state. Because the three messages are equal in priority, they will either be transmitted over the Wi-Fi datalink in the order they were stored in the queue, or simultaneously as the bandwidth of the datalink permits.

During the taxi however, system messages 710, free text messages 720 and text weather messages 730, for any given Class-of-Service, do not have the same priority. For this example, it may be assumed that an aircraft is on the ground at an airport and datalink status monitor 164 determines that a Cellular LTE datalink is available. The air-space user policy 172 on Class-of-Service categorizations, shown in Table 5, identifies Cellular LTE as also being a datalink having a high bandwidth/low cost Class-of-Service (again, identified at 745). On-board message broker 152 will notify the data link assignment function 166 to activate the Cellular LTE datalink associated with the high bandwidth/low cost Class-of-Service message queue, transitioning that queue from the Prioritize-and-Store operating state to the Prioritize-and-Forward operating state. If a message queue associated with the high bandwidth/low cost Class-of-Service includes a system message, a free text message and a text weather message, the queue broker will prioritize each of these three messages with different priority levels. The message having the system message 710 message group category will be assigned a priority level of 7 by the queue broker. The message having the free text 720 message group category will be assigned a priority level of 16, and the text weather 730 message group category will be assigned a priority level of 25. As such, the free text message will only be transmitted from this queue over the Cellular LTE datalink after the system message is transmitted, and the text weather message will only be transmitted from this queue over the Cellular LTE datalink after the free text message is transmitted. This is true regardless of the order in which the three messages may have been received and stored into the high bandwidth/low cost Class-of-Service message queue. This is the taxi flight phase, system messages have higher priority compared to free text messages, which have priority over text weather messages, and also cheaper datalinks are preferred to expensive ones.

Next, a climb phase example is considered. For this example, it may be assumed that an aircraft is air-borne and in climb after departing from an airport and datalink status monitor 164 determines that a Ka band datalink is available. The air-space user policy 172 on Class-of-Service categorizations, shown in Table 5, identifies Ka Band as a datalink having an intermediate bandwidth/intermediate cost Class-of-Service (identified in the table at 746 for each of the message class categories 710, 720 and 730). On-board message broker 152 will notify the data link assignment function 166 to activate the Ka Band datalink associated with the intermediate bandwidth/intermediate cost Class-of-Service message queue, transitioning that queue from the Prioritize-and-Store operating state to the Prioritize-and-Forward operating state. Once again, if a message queue associated with the intermediate bandwidth/intermediate cost Class-of-Service includes a system message, a free text message and a text weather message, the queue broker will prioritize each of these three messages differently. The message having the system message 710 message group category will be assigned a priority level of 2 by the queue broker. The message having the free text 720 message group category will be assigned a priority level of 6. However, in this phase of flight, the message in the text weather 730 message group category is not assigned a priority level and therefore will not be transmitted from this message queue. Instead, this text weather message will remain stored in the intermediate bandwidth/intermediate cost Class-of-Service until such time as the phase of flight changes to allow such messages via this Class-of-Service (and presuming that a datalink associated with that Class-of-Service is available). For example, when the phase of flight changes from climb to cruise, the queue broker will once again reprioritize the messages in the intermediate bandwidth/intermediate cost Class-of-Service queue as shown in Table 700. A message in the queue in the system message 710 message group category will be assigned a priority level of 2 by the queue broker, a message in the free text 720 message group category will be assigned a priority level of 7, and a message in the text weather 730 message group category will be assigned a priority level of 12. As such, assuming a Ka Band datalink remains available (or another intermediate bandwidth/intermediate cost Class-of-Service datalink has become available) text weather messages that were stored and on hold may again be transmitted from the queue, after any pending system messages or free text message are transmitted.

In general, when the datalink status monitor 164 indicates that a given datalink 140 is available, the on-board message broker 152 takes that information, along with a current state indicator that includes aircraft flight parameters (e.g., phase of flight information) provided by flight management system 170, and applies the rules defined by air-space user policy 172 to determine which, if any, on-ground or on-board message queues may be activated from Prioritize-and-Store to Prioritize-and-Forward. The message queues are each associated with a Class-of-Service, and the policy defined by the air-space user determines which Class-of-Service that given datalink 140 belongs to. When a message queues is activated and transitioned to Prioritize-and-Forward, the queue broker will transmit messages in that queue in an order of priority assigned to each message that corresponds to the current flight parameters (e.g., phase of flight). If a priority level is not defined for a message in the queue for the present phase of flight, that message will remain on hold in the queue until flight parameters change such that transmission of the message is permitted. Once a datalink 140 for a message queue is terminated, the queue broker will transition that queue back to the Prioritize-and-Store operating state.

Because the on-board queue broker 158 is co-located on the aircraft with the on-board message broker 152, these elements may directly communicate with each other and may even be integrated together in the same piece of avionics hardware. That is, the on-board message broker 152 may directly instruct the on-board queue broker 158 as to the current phase of flight or other aircraft flight parameters the queue broker 158 uses select message priorities within downlink message queues 159. It may also directly instruct queue broker 158 when one of the downlink message queues 159 should be transitioned to an active Prioritize-and-Forward queue, or back to a Prioritize-and-Store queue. In contrast, on-ground queue broker 120 is remotely located from the on-board message broker 152. Therefore on-ground queue broker 120 is also the recipient of downlink messages generated by on-board message broker 152 that indicate the current phase of flight or other aircraft flight parameters the queue broker 120 uses select message priorities within the uplink message queues 122.

FIG. 8 is a flow chart illustrating a method 800 for air-ground message communication of one embodiment of the present disclosure. In one embodiment, one or more elements of method 800 may be used in conjunction with, or in combination with, any implementation of the elements of air-ground message communication system 100 discussed above. As such the description of such elements provided above with respect to FIG. 1-7 above apply to like named elements of method 800 and vice versa.

The method begins at 810 with tagging a message with a message tag, the message tag comprising a Class-of-Service tag and a Priority tag. In one embodiment, uplink messages are tagged by an on-ground Class-of-Service (CoS) and Priority Tagging Module (such as tagging module 115) while downlink messages are tagged by an onboard Class-of-Service (CoS) and Priority Tagging Module (such as tagging module 156). In one embodiment, one or more CoS tagging filters and one or more Priority tagging filters are applied to an incoming message based on an air-space user defined policy, such as described with respect to FIG. 2.

Figure 5:
FIG. 5 is a table illustrating a matrix providing a categorization of the datalink technologies defined in FIG. 4 into 2-dimensional Class of Service categories for an air-space user policy of one embodiment of the present disclosure.

Once the message is tagged, the method proceeds to 820 with adding the message to a first message queue of a plurality of message queues based on a Class-of-Service indicted by the Class-of-Service tag. The first message queue is a message queue that is associated with one or more datalinks falling into the Class-of-Service identified by the message's CoS tag. In one embodiment, the various datalink technologies available to the aircraft are categorized into a 2-dimensional matrix by the air-space users, where each cell of the matrix represents a CoS category. FIG. 5, discusses above, provides on example of such a CoS categorization matrix.

The method proceeds to 830 with prioritizing the message relative to other messages in the first message queue based in part on content of the Priority tag and in part on a state indicator provided by an on-board messaging system. In one embodiment, the Priority tag applied to the message at 810 is determined from the type of information carried by the message and is defined based on categorizing the message into one of a plurality message group categories. Which type of message belongs to which message group category may be defined by the air-space user policy. In one embodiment, the prioritizing is implemented by a queue broker as described above. When the first message queue transitions to an active Prioritize-and-Forward queue, the order in which messages is transmitted from the queue is determined by a relative priority ranking applied to each message. That ranking may change from one flight phase to the next as described above, or based on other flight parameters such as an aircraft's position.

The method proceeds to 840 with transitioning the first message queue between a Prioritize-and-Store operating state and a Prioritize-and-Forward operating state based on a status of at least one data link associated with the first message queue. For example, an on-board message queue may monitor both the availability status of various datalinks the aircraft is equipped to utilize. When a datalink associated with the first message queue is available for use, and the air-space user policy permits use of that datalink technology based on the current flight parameters (e.g. during the current phase of flight) the on-board message queue will connect that datalink to the first message queue and transition the first message queue into an active Prioritize-and-Forward queue. When either availability of that datalink is lost, or the flight phase no longer permits its use, the on-board message queue will transition the first message queue back to Prioritize-and-Store. As such the method proceeds to 850 wherein while the first message queue is in the Prioritize-and-Store operating state, the first message queue stores the message; and wherein while the first message queue is in the Prioritize-and-Forward operating state, the message is transmitted from the first message queue in an order of assigned priority.

Example Embodiments

Example 1 includes a method for message communication, the method comprising: tagging a message with a message tag, the message tag comprising a Class-of-Service tag and a Priority tag; adding the message to a first message queue of a plurality of message queues based on a Class-of-Service indicted by the Class-of-Service tag; prioritizing the message relative to other messages in the first message queue based in part on content of the Priority tag and in part on a state indicator provided by an on-board messaging system; and transitioning the first message queue between a Prioritize-and-Store operating state and a Prioritize-and-Forward operating state based on a status of at least one data link associated with the first message queue; wherein while the first message queue is in the Prioritize-and-Store operating state, the first message queue stores the message; and wherein while the first message queue is in the Prioritize-and-Forward operating state, the message is transmitted from the first message queue in an order of assigned priority.

Example 2 includes the method of example 1, wherein the Class-of-Service tag is a two-dimensional classification including a relative cost component and a relative bandwidth capacity component.

Example 3 includes the method of any of examples 1-2, wherein tagging a message with a message tag further comprises: assigning the Priority tag to the message based on a message group category indicating a type of data carried by the message.

Example 4 includes the method of any of examples 1-3, wherein the message is an uplink message and the first message queue is an on-ground uplink message queue managed by an on-ground message queue broker.

Example 5 includes the method of example 4, wherein tagging the uplink message is performed by an on-ground Class-of-Service and Priority Tagging Module based on a profile accessed by the on-ground Class-of-Service and Priority Tagging Module and defined by an air-space user.

Example 6 includes the method of any of examples 4-5, wherein the status of the at least one air-ground data link associated with the first message queue is based on: receiving a message from the on-board messaging system that indicates an activation of the first message queue into the Prioritize-and-Forward operating state.

Example 7 includes the method of any of examples 4-6, wherein adding the uplink message to the first message queue further comprises: determining a number of aircraft subscribed to the first message queue; and replicating the message within the first message queue based on the number of aircraft subscribed to the first message queue.

Example 8 includes the method of any of examples 1-7, wherein the message is a downlink message and the first message queue is an on-board downlink message queue managed by an on-board message queue broker.

Example 9 includes the method of example 8, wherein tagging the downlink message is performed by an on-board Class-of-Service and Priority Tagging Module based on a profile accessed by the on-board Class-of-Service and Priority Tagging Module and defined by an air-space user.

Example 10 includes the method of any of examples 8-9, wherein the status of the at least one data link associated with the first message queue is based on: determining whether the at least one data link is available; and determining whether the at least one data link is authorized for use based on current aircraft flight parameters.

Example 11 includes the method of example 10, wherein the current flight parameter comprises at least one of: a current phase of flight; or a current aircraft position.

Example 12 includes a message communication system, the system comprising: a first Class-of-Service and Priority Tagging Module configured to tag messages with a message tag, the message tag comprising a Class-of-Service tag and a Priority tag; a first queue broker that includes a plurality of message queues, wherein each plurality of message queues is associated with a Class-of-Service defined by at least one datalink technology, wherein the first queue broker assigns each of the messages to one of the plurality of message queues based on a Class-of-Service indicated by the Class-of-Service tag; and an on-board message broker that monitors datalink availability and current state indicators, wherein the on-board message broker communicates to the first queue broker when to transition one or more of the plurality of message queues between a Prioritize-and-Store operating state and a Prioritize-and-Forward operating state based on the datalink availability and the current state indicators.

Example 13 includes the system of example 12, wherein when a first message queue of the plurality of message queues is transitioned to the Prioritize-and-Forward operating state, the on-board message broker transmits messages from the first message queue in an order determined at least in part from the Priority tag.

Example 14 includes the system of any of examples 12-13, wherein the first Class-of-Service and Priority Tagging Module is an on-board Class-of-Service and Priority Tagging Module, the messages received at the first Class-of-Service and Priority Tagging Module are downlink messages, the first queue broker is an on-board queue broker, and the plurality of message queues comprise downlink message queues.

Example 15 includes the system of any of examples 12-14, wherein the current state indicators include a current flight parameter that comprises at least one of: a current phase of flight; or a current aircraft position.

Example 16 includes the system of any of examples 12-15, wherein the Class-of-Service tag is a two-dimensional classification including a relative cost component and a relative bandwidth capacity component.

Example 17 includes the system of any of examples 12-16, further comprising an air-space user policy accessible by the first Class-of-Service and Priority Tagging Module, wherein the first Class-of-Service and Priority Tagging Module receives an incoming message, it categorizes the message, based on the air-space user generated policy, into one of a plurality of message groups pre-defined by the air-space user in policy based on a type of data carried by the message.

Example 18 includes the system of any of examples 12-17, wherein the first Class-of-Service and Priority Tagging Module is an on-ground Class-of-Service and Priority Tagging Module, the messages received at the first Class-of-Service and Priority Tagging Module are uplink messages, the first queue broker is an on-ground queue broker, and the plurality of message queues comprise uplink message queues.

Example 19 includes the system of example 18, wherein a status of the at least one data link associated with a first uplink message queue is communicated by the on-board message broker to the on-ground queue broker via a downlink message.

Example 20 includes the system of any of examples 18-19, wherein the on-ground queue broker determines a number of aircraft subscribed to a first uplink message queue and replicates one or more messages stored in a first uplink message queue based on the number of aircraft subscribed to the first message queue.

In various alternative embodiments, system elements, method steps, or examples described throughout this disclosure (such as the tagging modules, queue brokers, the on-board message broker, the on-board and on-ground messaging systems, or sub-parts thereof, for example) may be implemented on one or more computer systems, field programmable gate array (FPGA), or similar devices comprising a processor and memory hardware executing code to realize those elements, processes, or examples, said code stored on a non-transient data storage device. Therefore other embodiments of the present disclosure may include such a processor and memory hardware as well as elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for message communication, the method comprising:
   tagging a message with a message tag, the message tag comprising a Class-of-Service tag and a Priority tag;
   adding the message to a first message queue of a plurality of message queues based on a Class-of-Service indicted by the Class-of-Service tag;
   prioritizing the message relative to other messages in the first message queue based in part on content of the Priority tag and in part on a state indicator provided by an on-board messaging system; and
   transitioning the first message queue between a Prioritize-and-Store operating state and a Prioritize-and-Forward operating state based on a status of at least one data link associated with the first message queue;
   wherein while the first message queue is in the Prioritize-and-Store operating state, the first message queue stores the message; and
   wherein while the first message queue is in the Prioritize-and-Forward operating state, the message is transmitted from the first message queue in an order of assigned priority.

2. The method of claim 1, wherein the Class-of-Service tag is a two-dimensional classification including a relative cost component and a relative bandwidth capacity component.

3. The method of claim 1, wherein tagging a message with a message tag further comprises:
   assigning the Priority tag to the message based on a message group category indicating a type of data carried by the message.

4. The method of claim 1, wherein the message is an uplink message and the first message queue is an on-ground uplink message queue managed by an on-ground message queue broker.

5. The method of claim 4, wherein tagging the uplink message is performed by an on-ground Class-of-Service and Priority Tagging Module based on a profile accessed by the on-ground Class-of-Service and Priority Tagging Module and defined by an air-space user.

6. The method of claim 4, wherein the status of the at least one data link associated with the first message queue is based on:
receiving a message from the on-board messaging system that indicates an activation of the first message queue into the Prioritize-and-Forward operating state.

7. The method of claim 4, wherein adding the uplink message to the first message queue further comprises:
determining a number of aircraft subscribed to the first message queue; and
replicating the message within the first message queue based on the number of aircraft subscribed to the first message queue.

8. The method of claim 1, wherein the message is a downlink message and the first message queue is an on-board downlink message queue managed by an on-board message queue broker.

9. The method of claim 8, wherein tagging the downlink message is performed by an on-board Class-of-Service and Priority Tagging Module based on a profile accessed by the on-board Class-of-Service and Priority Tagging Module and defined by an air-space user.

10. The method of claim 8, wherein the status of the at least one data link associated with the first message queue is based on:
determining whether the at least one data link is available; and
determining whether the at least one data link is authorized for use based on current aircraft flight parameters.

11. The method of claim 10, wherein the current flight parameter comprises at least one of:
a current phase of flight; or
a current aircraft position.

12. A message communication system, the system comprising:
a first memory comprising an on-board message broker;
a first Class-of-Service and Priority Tagging Module stored in one of the first memory and a second memory and configured to be processed respectively by one of a first processor coupled to the first memory or a second processor coupled to the second memory;
wherein the first Class-of-Service and Priority Tagging Module is configured to tag messages with a message tag, the message tag comprising a Class-of-Service tag and a Priority tag;
a first queue broker that includes a plurality of message queues stored in the one of the first memory and the second memory;
wherein each of the plurality of message queues is associated with a Class-of-Service defined by at least one datalink technology, wherein the first queue broker assigns each of the messages to one of the plurality of message queues based on a Class-of-Service indicated by the Class-of-Service tag; and
wherein the on-board message broker is configured to monitor datalink availability and current state indicators and communicate to the first queue broker when to transition one or more of the plurality of message queues between a Prioritize-and-Store operating state and a Prioritize-and-Forward operating state based on the datalink availability and the current state indicators.

13. The system of claim 12, further comprising an air-space user generated policy, stored in the one of the first memory and the second memory, accessible by the first Class-of-Service and Priority Tagging Module, wherein the first Class-of-Service and Priority Tagging Module receives an incoming message, it categorizes the message, based on the air-space user generated policy, into one of a plurality of message groups pre-defined by the air-space user in policy based on a type of data carried by the message.

14. The system of claim 12, wherein the first Class-of-Service and Priority Tagging Module is an on-board Class-of-Service and Priority Tagging Module stored in the first memory, the messages received at the first Class-of-Service and Priority Tagging Module are downlink messages, the first queue broker is an on-board queue broker stored in the first memory, and the plurality of message queues comprise downlink message queues.

15. The system of claim 12, wherein the current state indicators include a current flight parameter that comprises at least one of:
a current phase of flight; or
a current aircraft position.

16. The system of claim 12, wherein the Class-of-Service tag is a two-dimensional classification including a relative cost component and a relative bandwidth capacity component.

17. The system of claim 12, further comprising an air-space user generated policy accessible by the first Class-of-Service and Priority Tagging Module, wherein the first Class-of-Service and Priority Tagging Module receives an incoming message, it categorizes the message, based on the air-space user generated policy, into one of a plurality of message groups pre-defined by the air-space user in policy based on a type of data carried by the message.

18. The system of claim 12, wherein the first Class-of-Service and Priority Tagging Module is an on-ground Class-of-Service and Priority Tagging Module stored in the second memory, the messages received at the first Class-of-Service and Priority Tagging Module are uplink messages, the first queue broker is an on-ground queue broker stored in the second memory, and the plurality of message queues comprise uplink message queues.

19. The system of claim 18, wherein a status of the at least one data link associated with a first uplink message queue is communicated by the on-board message broker to the on-ground queue broker via a downlink message.

20. The system of claim 18, wherein the on-ground queue broker determines a number of aircraft subscribed to a first uplink message queue and replicates one or more messages stored in a first uplink message queue based on the number of aircraft subscribed to the first message queue.

* * * * *